United States Patent [19]

Gardner et al.

[11] Patent Number: 4,565,619
[45] Date of Patent: Jan. 21, 1986

[54] COMPOSITE ELECTRODE STRUCTURE

[75] Inventors: Robert J. Gardner, Norton; John R. Martin, Foxboro, both of Mass.

[73] Assignee: The Foxboro Company, Foxboro, Mass.

[21] Appl. No.: 467,711

[22] Filed: Feb. 18, 1983

[51] Int. Cl.$^4$ .................. G01N 27/46; C25B 11/12; G01F 1/58
[52] U.S. Cl. .................. 204/400; 204/1 T; 204/294; 73/861.12
[58] Field of Search .................. 204/1 T, 400, 294; 73/861.12

[56] References Cited

U.S. PATENT DOCUMENTS

| | | | |
|---|---|---|---|
| 3,798,142 | 3/1974 | Evans | 204/196 |
| 4,214,969 | 7/1980 | Lawrance | 204/255 |
| 4,265,727 | 5/1981 | Beckley | 204/242 |
| 4,285,796 | 8/1981 | Stoner et al. | 204/294 |
| 4,337,139 | 6/1982 | Gestaut et al. | 204/292 |
| 4,337,140 | 6/1982 | Solomon | 204/292 |
| 4,339,322 | 7/1982 | Balko et al. | 204/255 |
| 4,369,104 | 1/1983 | Beckley | 204/294 |
| 4,414,092 | 11/1983 | Lu et al. | 204/294 |

FOREIGN PATENT DOCUMENTS 2950039 11/1982 Fed. Rep. of Germany.

Primary Examiner—T. Tung
Attorney, Agent, or Firm—Jack H. Wu; Terrence (Terry) Martin; William E. Meyer

[57] ABSTRACT

A nonporous composite electrode, particularly suitable for use in electromagnetic flowmeters, includes a nonmetallic, electrically conductive element consisting of a fused mass of polymeric material, such as perfluoroalkoxy (pfa) fluoropolymer, and carbon fibers. The electrode is fabricated by stacking alternating layers of polymeric film and carbon fiber paper, subjecting the assembly to sufficient heat and pressure to intermix the two components and bond them into a coherent mass, and fusing the resultant composite material onto a mounting pin. Using a polymeric material compatible with the polymeric liner of an electromagnetic flowtube allows the finished electrode to be fused into the liner, again by application of heat and pressure, so as to achieve a seamless interface. This configuration virtually eliminates process fluid leaks around the electrode, while the electrode structure itself exhibits exceptional high temperature stability and corrosion resistance.

11 Claims, 8 Drawing Figures

COMPOSITE ELECTRODE STRUCTURE

BACKGROUND OF THE INVENTION

The present invention relates generally to the field of nonmetallic electrodes, and more particularly to such electrodes which are adaptable for use in electromagnetic flowmeters.

Electromagnetic flowmeters have been used extensively in the process control industry for many years. These flowmeters operate on the general principle that an electrically conductive fluid passing through a magnetic field generates an electrical signal which can be sensed by electrodes in contact with the fluid, the magnitude of the signals being related to the volumetric flow rate. However, the direct contact of the electrodes with the process fluid creates several problems.

First, the section of conduit within the flowmeter through which the fluid passes must be non-conducting. Often this is accomplished by applying to the interior of a metal conduit a liner of electrically insulating material, usually polytetrafluoroethylene (ptfe). Because the process fluids are often corrosive or are at extremely elevated temperatures, the insulating layers are carefully selected to withstand these adverse environments. However the integrity of the liner is compromised when a conventional electrode is inserted through the liner. Therefore, it is common for there to be an inadequate seal between the electrode and the insulating liner. Cracks and crevices at this interface permit the process fluid to leak past, eventually resulting in shorting of the electrode to the surrounding metal conduit. In the case of sanitary flowmeter applications, such as for dairy products, these crevices also serve to collect the fluid and promote generation of harmful bacteria.

Second, conventional electrodes are typically fabricated of corrosion-resistant metals, often a stainless steel or a noble metal, such as platinum, when stainless steel has inadequate corrosion resistance to the process environment. Despite the added expense of such metals, the corrosion resistance of the metallic electrode still may not be as effective as that of the surrounding insulating liner. Pitting and fouling are examples of problems which occur on the fluid-contacting surfaces of present metallic electrodes. The electrode and liner also have markedly different temperature coefficients of expansion. Therefore, prolonged exposure to corrosive process fluids, temperature cycling, and high temperatures tend to promote the development of crevices in the electrode-to-liner interface, aggravating the aforementioned leakage problem.

Attempts have been made to improve the integrity of the interface between an electromagnetic flowmeter electrode and the surface in which it is mounted. For example, U.S. Pat. No. 3,746,896 shows the use of an intermediate glass sealant between the electrode and the surrounding section of conduit. However, such approaches do not avoid the basic problem, namely that two dissimilar materials, such as a metal electrode and an electrical insulator, having drastically different physical characteristics, must be in intimate contact and yet maintain a fluid-tight seal while subjected to a hostile process environment. Several types of composite electrode structures, such as the carbon-containing versions disclosed in U.S. Pat. Nos. 4,337,139, 4,337,140 and 4,339,322 have found uses in other applications. However, none has been adapted to the demanding requirements of electromagnetic flowmeters.

Therefore, in view of the above, it is an object of the present invention to provide a nonporous electrode assembly having thermal and corrosion-resistance characteristics which are closely matched to those of an electrically insulating material in which it is to be mounted.

It is another object of the present invention to permit integration of such an electrode assembly into the insulating material to produce an essentially seamless interface therebetween, thereby preventing fluid leakage past the electrode.

It is yet a further object of the present invention that the electrode assembly be easily and economically adaptable to existing electromagnetic flowmeter applications.

SUMMARY OF THE INVENTION

An embodiment of a nonporous electrode assembly in accordance with the present invention includes an electrically conductive element containing a fused mixture of carbon fibers and a polymeric material, bonded to a contact member which adapts the assembly for electrical coupling to an external electrical circuit. A particularly effective way of forming the electrically conductive element is by stacking layers of carbon fiber paper and sheets of the polymeric material to form an interleaved structure. Through application of heat and pressure, the carbon fiber layers are forced into intimate contact. Molten polymer impregnates the fiber layers to transform the structure into a nonporous, mechanically stable mass which is electrically conductive due to the interwoven network of carbon fibers. The resultant composite material is mounted on the contact member, and bonded solidly thereto by application of heat and pressure, the polymeric material acting as the bonding adhesive.

To adapt the electrode assembly for use in an electromagnetic flowmeter, a cavity is created within the polymeric inner liner of the flowtube, the cavity conforming generally to the electrode shape. An electrode, made with a polymeric material identical to or compatible with that of the flowmeter liner, is inserted in the cavity with an intervening film of the same or a compatible polymeric material therebetween. Through application of a heating tool simultaneously to the electrode and to the adjacent region of the liner, the temperature is raised above the melting point of the polymeric material, and the electrode and liner are fused into an integral structure. As a result, the electrode surface becomes flush with the liner surface, and the interface therebetween is crevice-free.

The presence of the carbon fibers within the fused mixture, as opposed to other forms of carbon, achieves substantial conductivity per unit volume. Thus, the electrode exhibits electrical performance characteristics adequate for use as sensing electrodes in electromagnetic flowmeters. Although favorable results have been achieved using perfluoroalkoxy (pfa) as the polymeric material within the electrode, the invention can be practiced with a wide variety of other polymeric fluoropolymers.

BRIEF DESCRIPTION OF THE DRAWINGS

The novel features and advantages of the present invention will become apparent to those skilled in the art from the following description of the preferred embodiments in conjunction with the accompanying drawings in which.

DESCRIPTION OF THE ILLUSTRATED EMBODIMENT

Figure 1B:
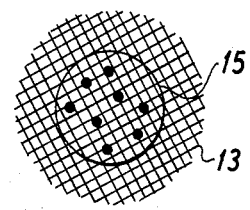
FIGS. 1A and 1B are side and top views, respectively, of a mounting pin assembly used in fabricating an electrode assembly in accordance with the present invention.
Figure 1A:
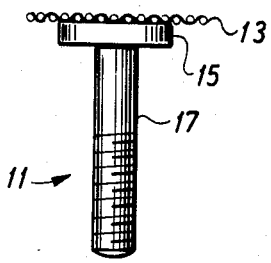

Referring now to FIG. 1A, a mounting pin assembly 11 provides a structural foundation for an electrode assembly built in accordance with the present invention. A fine mesh metal screen 13 is spot welded (see also FIG. 1B) to a flattened head portion 15 of a threaded metal shank 17. Preferably the mesh screen and shank are made of a highly corrosion-resistant material, such as stainless steel, perhaps with a noble metal coating to prevent galvanic action with other components of the finished electrode assembly. This screen is in substantial contact with the surface of the flattened head portion, to insure both structural strength and good electrical conductivity therebetween. The shank ultimately will serve as a means to electrically couple the completed electrode assembly to conventional electronic circuitry, in a manner hereinafter described.

Figure 2:
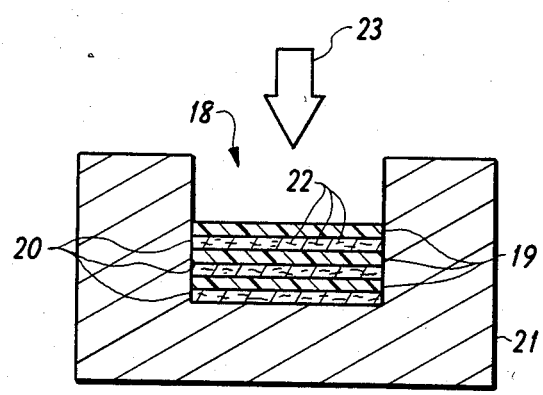
FIG. 2 is a side view, in section, of a stack of layers of carbon fiber paper and sheets of pfa ready for fusing.

With reference now to FIG. 2, there is shown a stacked array 18 of alternate thin (typically 3 mils/0.008 cm) sheets of polymeric film 19 and carbon fiber paper 20 seated within a mold 21. The particular polymeric film depicted here is perfluoroalkoxy (pfa) fluoropolymer, such as that sold by E. I. du Pont de Nemours and Company under the trademark Teflon PFA. The carbon fiber paper is essentially a nonwoven fabric of carbon fibers 22 fixed by a binder such as polyvinyl acetate. A material of this type is sold by the Stackpole Fibers Company under their trademark PANEX CFP 30-05. The carbon fibers nominally are 0.25 inch in length, and have a diameter of 8 microns. Sufficient layers of the carbon fiber paper and pfa film are used to achieve the desired electrode thickness. It should be noted that, if desired, multiple layers of carbon fiber paper may be placed back-to-back, with a pfa film layer between adjacent multiples, rather than having a single carbon fiber layer adjacent a single pfa layer.

Using any of a variety of conventional molding techniques and apparatus (not shown), the temperature of the stacked array 18 is raised above the melting point of the pfa film 19 which is approximately 580°–590° F. (305°–310° C.). Simultaneously the array is compressed, in the direction of an arrow 23, with a pressure of approximately 1200–1500 psi. This molding operation causes molten pfa to flow into the voids between the carbon fibers 22, and to uniformly wet the fibers. It also forces adjacent carbon fiber paper layers into contact with one another, so that, upon cooling, the multiple layers become bonded into an integral mass, a composite electrode material 24 (see FIG. 4).

Figure 3:
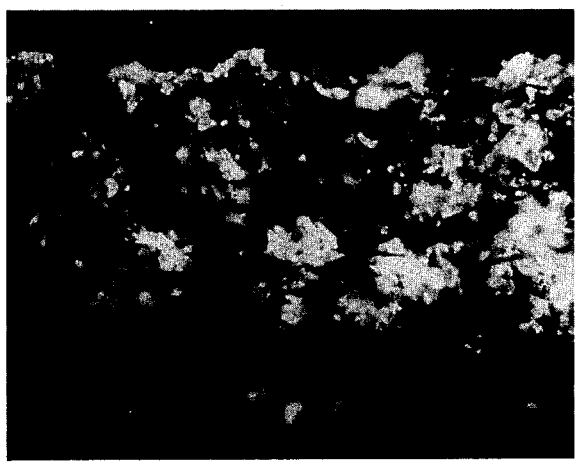
FIG. 3 is a photomicrograph of a cross-section of the fused composite electrode material.
Figure 4:
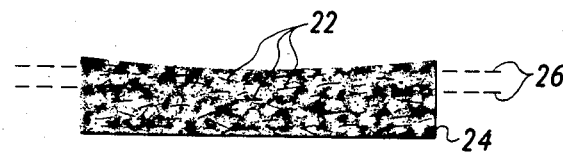
FIG. 4 is a side view, in section, of the fused composite electrode material, simulating the view shown in FIG. 3.

Because of the manner in which the composite material 24 is fabricated, it possesses a unique internal structure, as shown clearly in FIGS. 3 and 4, which are end-on views of a cross-section of the material. Prior to the application of heat and pressure, essentially all the fibers within each thin carbon fiber paper layer 20 are randomly aligned only within imaginary X-Y planes transverse to the thickness of the paper. In other words, there is no random orientation of the fibers in all three dimensions (i.e., X, Y and Z) but the orientation is predominantly in a succession of parallel X-Y planes.

Since there is no gross movement of the carbon fibers throughout the mass during the molding operation, this X-Y orientation remains essentially undisturbed. The electrical continuity between layers is established by some of the X-Y oriented carbon fibers in each fiber paper layer being in side-to-side contact with the X-Y oriented fibers in the adjacent layers. Thus, although the composite material is an integral mass, it still retains an essentially stratified structure, in that the fibers are lying within these parallel imaginary planes, such as those within dotted lines 26. This differs markedly from the random fiber orientation usually found in other molded carbon fiber composite materials.

As mentioned above, the compression does produce a substantial amount of fiber-to-fiber contact between adjacent carbon fiber layers. Thus, the network of myriad fiber interconnections makes the composite material 24 electrically conductive throughout its volume. Although fibers having a nominal length of 0.25 inch were used, it is expected that even longer fibers, perhaps up to 0.75 inch, would enhance the electrical conductivity, because of a greater degree of fiber interweaving. Testing has shown that a composite material having a percentage by weight of 15-20% carbon fibers, with the remaining 80-85% being pfa, exhibits a typical resistivity of 1 ohm-cm. Clearly, the resistivity is dependent on the concentration of carbon fibers, and the number of fiber-to-fiber contact points. Such a composite material also is found to be essentially nonporous, because of the effective impregnation of the molten pfa between the carbon fibers to completely wet each fiber. Also, the high proportion of pfa relative to the carbon fibers helps to achieve the nonporosity.

Figure 5:
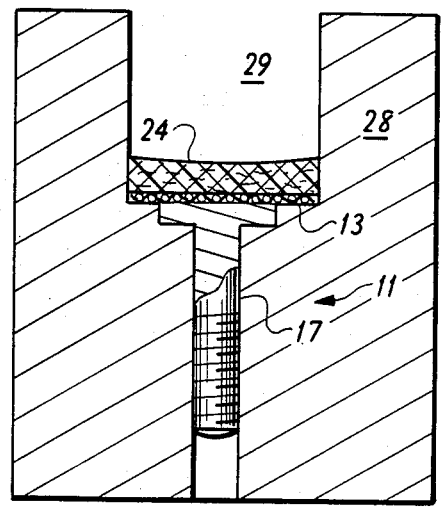
FIG. 5 is a side view, in section, of the mounting pin assembly of FIG. 1A with the fused composite material deposited thereon in preparation for molding.

In the next step in the fabrication process, the mounting pin assembly 11 is seated at the bottom of a cavity 29 within a holding fixture 28 (see FIG. 5). Deposited on top of the metal screen 13 is an appropriately sized and shaped piece of the composite electrode material 24. Again, by raising the temperature above 580° F. (305° C.) and applying downward pressure of approximately 1,000 psi, the pfa penetrates through the holes within the fine mesh screen 13, and acts as an adhesive to rigidly attach the element to the pin assembly 11. The intimate contact between the conductive element and the screen results in electrical continuity from the outer surface of the electrode element through the shank 17 itself.

It should be apparent that practically any desired electrode shape can be produced, depending on the selection of the mesh screen 13, the holding fixture 28, and the shape of the molded carbon fiber and pfa composite material 24.

The composite electrode assembly is essentially adaptable to any applications served by more conventional electrode structures. However, the known superior corrosion resistance and high temperature stability of both carbon fibers and pfa, as well as the nonporosity of the composite electrode material make the assembly particularly suitable for use as a sensing electrode in an electromagnetic flowmeter.

Figure 6:
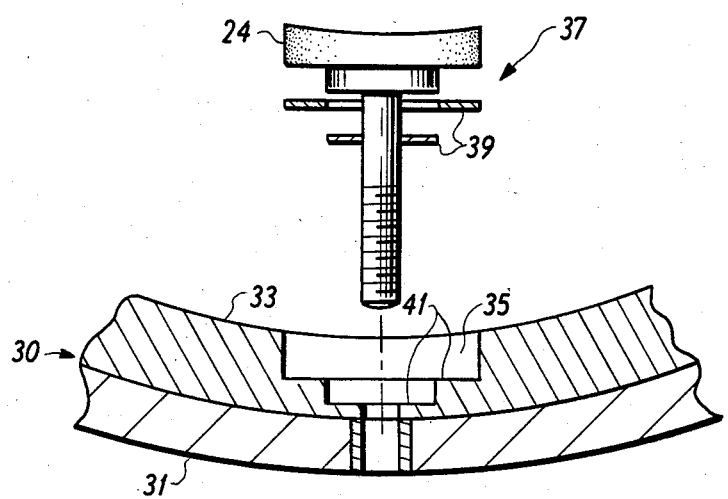
FIG. 6 is an exploded view, partially in section, depicting the insertion of a completed electrode assembly into the insulating liner of an electromagnetic flowmeter.

As shown in FIG. 6, a wall 30 of a typical electromagnetic flowmeter has an outer stainless steel housing 31, and an inner electrically insulating liner 33, which is in contact with a process fluid (not shown) passing therethrough. Polytetrafluoroethylene (ptfe) is the most common of several materials or coatings used in such liners. An example of such a flowmeter is the 2800 Series Magnetic Flowtube manufactured by The Foxboro Company, Foxboro, Mass., assignee of the present invention. Alternatively, the wall may be made entirely of an electrically insulating material, rather than having an outer shell of metal and only a thin inner liner.

A cavity 35 is machined, thermally formed, cast, or molded into the surface of the liner 33, and through the underlying housing 31, appropriately shaped to receive the completed electrode assembly 37. The electrode assembly is inserted into the cavity such that the metal shank 17 passes through to the exterior of the housing. In this way electrical connections may be made between the shank and the processing circuitry typically used with electromagnetic flowmeters. Thin rings 39 of pfa material are disposed between the underside of the electrode assembly and mounting surfaces 41 within the ptfe liner. As will be seen hereinafter, these rings serve as adhesive to securely bond the electrode in place.

Figure 7:
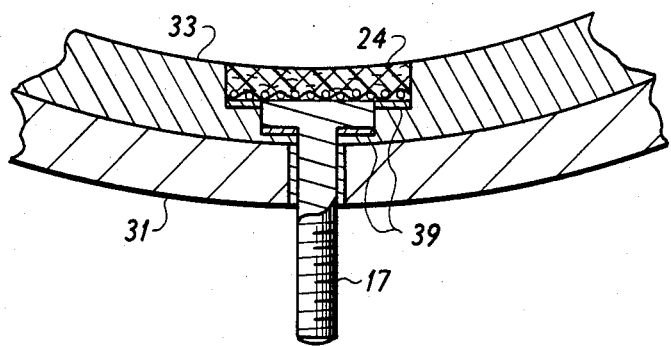
FIG. 7 is a side view, partially in section, showing the electrode fully integrated into the liner.

With the electrode assembly 37 seated securely in the cavity 35, a heating tool (not shown) at a temperature of approximately 800° F. is applied to both the electrode and the adjacent region of the liner 33 with relatively low force (approximately 150 pounds per square inch). Simultaneously, the exterior of the flowmeter housing 31 is heated, in the vicinity of the electrode, to approximately 500° F., to reduce the heat sink effect of the housing. During this operation, the pfa rings 39 melt to effect a secure, fluid-tight bond between the metal mounting pin and the ptfe liner. Also, the pfa within the composite electrode material 24 itself reflows and fuses uniformly with molten ptfe from the adjacent liner region into an integrated mass. Tensile tests have shown that the bond strength in this interface region is as strong as that of the liner itself. This fusing operation produces a crevice-free interface between the electrode and the adjacent liner area, thereby preventing passage of corrosive process fluids past the electrode (see FIG. 7). In addition, the electrode surface is flush with the surface of the liner, so as to minimize erosion of the electrodes by abrasive slurries.

For purposes of illustrating the performance characteristics of an electromagnetic flowmeter utilizing this type of electrode construction, the following non-limiting example is offered. A pair of ½-inch diameter composite electrodes was integrated into a standard 4-inch flowmeter. Resistance measurements, from electrode to electrode through tap water, were made with an a.c. impedance bridge at 1 KHz. The resistance measured was approximately 5000 ohms, the same as for 5/16-inch stainless steel electrodes. Flow tests have shown measurement accuracy to be equivalent to that attained with the stainless electrodes as well. Flow results were achieved in both a.c. and pulsed d.c. operating modes of the flowmeter.

Experimentation has shown that slightly abrading the electrode's fluid-contacting surface can improve the electrical contact with the process fluid, presumably because of increased exposure of the conductive carbon fibers.

An additional benefit anticipated of the electrode construction described above is that the surface of the electrode in contact with the process fluid will be more resistant to fouling than conventional metallic electrodes. This is because of the excellent anti-stick properties of the pfa, as well as its noncorroding nature.

As mentioned above, some electromagnetic flowmeters employ a section of conduit made entirely of a polymeric material. In these cases it may be desirable to form an entire electrode assembly from the carbon fiber and pfa composite material 24 alone, omitting the metal mounting pin assembly 11. The electrode assembly is fused into the polymeric conduit in essentially the same manner as described above and electrical connections are made directly to the backside of the composite material via an access hole cut into the outside surface of the conduit. The mounting pin assembly does prove useful in meters with unbonded liners, because it serves to hold the liner firmly in place. In most instances, the ptfe liners are not bonded to the surrounding metal conduit.

Although the described embodiment has employed pfa as the polymeric material within the electrode, the teachings of the present invention can be applied with equal effectiveness to other polymeric materials such as epoxy, polyester, urethane, and most fluoropolymers. Also, the applications of the electrode need not be restricted to an electromagnetic flowmeter. Research has indicated that the composite electrode structure can be fused securely into glass, ceramic and polymeric materials, which would make their use feasible in electrochemical probe applications. One such application is in wetted electrode conductivity meters.

It should be pointed out that an electrically insulating layer can be formed on the outer fluid-contacting surface of the electrode by incorporating a thick layer of polymeric material thereon. This results in a capacitive or "non-contacting" electrode which offers certain operational advantages, both when applied to electromagnetic flowmeters and to electrochemical probe applications.

Clearly, certain modifications and substitutions to the disclosed embodiment may become apparent to those skilled in the art, but which do not depart from the spirit of the present invention. For example, other means of inserting and seating the completed electrode assembly within the polymeric liner may be developed. Also, other forms of woven or nonwoven carbon fiber fabrics or mats may be used to replace one or more layers of the carbon fiber paper. It is intended however that such modifications and substitutions be included within the scope of the following claims.

What is claimed:

1. A nonporous electrode assembly comprising: a composite electrode element, including:
    a plurality of carbon fibers arranged in a threedimensional array, the majority of said fibers being randomly aligned within a series of mutually parallel planes, yet being packed densely enough to produce multiple points of contact thereamong, said electrode element having an elongated face with a longitudinal dimension which is greater than a thickness dimension measured perpendicular to said elongated face, said parallel planes being parallel to said elongated face, whereby electrical continuity is established throughout said array, and the electrical conductivity characteristic of said electrode element is greater in a direction parallel said elongated face than that in a direction normal to said elongated face, and a matrix of polymeric material permeating the interfiber voids within said array so as to produce a coherent, nonporous structure; and contact means for electrically coupling said electrode element to an external electrical circuit.

2. The electrode assembly as set forth in claim 1, wherein said polymeric material is a thermoplastic material.

3. The electrode assembly as set forth in claim 2, wherein said thermoplastic material is perfluoroalkoxy.

4. The electrode assembly as set forth in claim 3, wherein the weight percentage of carbon fibers within said composite electrode element is in the range from 15–20%, and the weight percentage of perfluoroalkoxy is in the range from 80–85%.

5. The electrode assembly as set forth in claim 1 wherein said contact means comprises:

an electrically conductive mesh screen in electrical contact with said element and permeated by said polymeric material of said element; and an electrically conductive shank fixedly attached to said screen.

6. In an electromagnetic flow meter of the type including a process fluid-contacting plymeric section, an improved signal-detecting electrode adapted to be embedded in said polymeric section, wherein said electrode comprises:

a network of interconnecting carbon fibers which are aligned in planes parallel to a longitudinal axis of said polymeric section wherein the electrical conductivity characteristic of said electrode is greater in a direction parallel to said longitudinal axis than that in a direction normal to said longitudinal axis, and a polymeric material permeating the inter-fiber voids within said network so as to produce a coherent, non-porous structure, the polymeric material being integrally fused into said polymeric section so that said non-porous structure is embedded in said polymeric section with a fluid-tight seal.

7. The improved electrode as set forth in claim 6 further comprising:

an electrically conductive mesh screen in electrical contact with said electrode and permeated by said polymeric material; and an electrically conductive shank fixedly attached to said screen.

8. The improved electrode as set forth in claim 7 wherein said polymeric material is perfluoroalkoxy.

9. The improved electrode as set forth in claim 8 wherein the weight percentage of carbon fibers within said electrode is in the range from 15–20%, and the weight percentage of perfluoroalkoxy is in the range from 80–85%.

10. The improved electrode as set forth in claim 6 wherein said polymeric material is perfluoroalkoxy.

11. The improved electrode as set forth in claim 10 wherein the weight percentage of carbon fibers within said electrode is in the range from 15–20%, and the weight percentage of perfluoroalkoxy is in the range from 80–85%.

* * * * *